United States Patent
Wells et al.

[11] 3,714,530
[45] Jan. 30, 1973

[54] VOLTAGE MULTIPLYING WAFER CAPACITOR

[75] Inventors: Richard Farner Wells, Elizabethtown; Robert Eden Fry, Mechanicsburg, both of Pa.

[73] Assignee: AMP Incorporated, Harrisburg, Pa.

[22] Filed: Aug. 6, 1971

[21] Appl. No.: 169,716

[52] U.S. Cl. .................317/261, 317/256, 321/15
[51] Int. Cl. .............................................H02m 7/24
[58] Field of Search..........317/242, 261, 256, 101 C; 321/15; 29/624 R, 25.42 R, 25.41 R

[56] References Cited

UNITED STATES PATENTS

| | | | |
|---|---|---|---|
| 3,589,003 | 6/1971 | Kastner | 317/261 R |
| 3,593,107 | 7/1971 | Chilton et al. | 317/256 |
| 3,568,036 | 3/1971 | Rosenberg | 321/15 R |
| 3,238,429 | 3/1966 | Bornhorst | 317/261 R |
| 2,968,752 | 1/1961 | Rubinstein et al. | 317/242 R |
| 3,584,287 | 6/1971 | Binoche | 321/15 R |
| 3,183,485 | 5/1965 | Cubbage | 317/242 X |

FOREIGN PATENTS OR APPLICATIONS 523,152    5/1951    Canada ..........................317/261

*Primary Examiner*—William H. Beha, Jr.
*Attorney*—William J. Keating et al.

[57] ABSTRACT

A wafer-type capacitor of the voltage multiplying type having a plurality of conducting secondary plates, with each of said plates in parallel with one of a pair of input primary plates, and with sheets of dielectric material interposed between the primary and secondary plates and combined with a dielectric adhesive to form a wafer configuration, wherein each secondary plate associated with one of the primary plates is directionally coupled to an opposed secondary plate associated with the other primary plate in order to provide a voltage multiplying capacitor in a wafer configuration.

6 Claims, 10 Drawing Figures

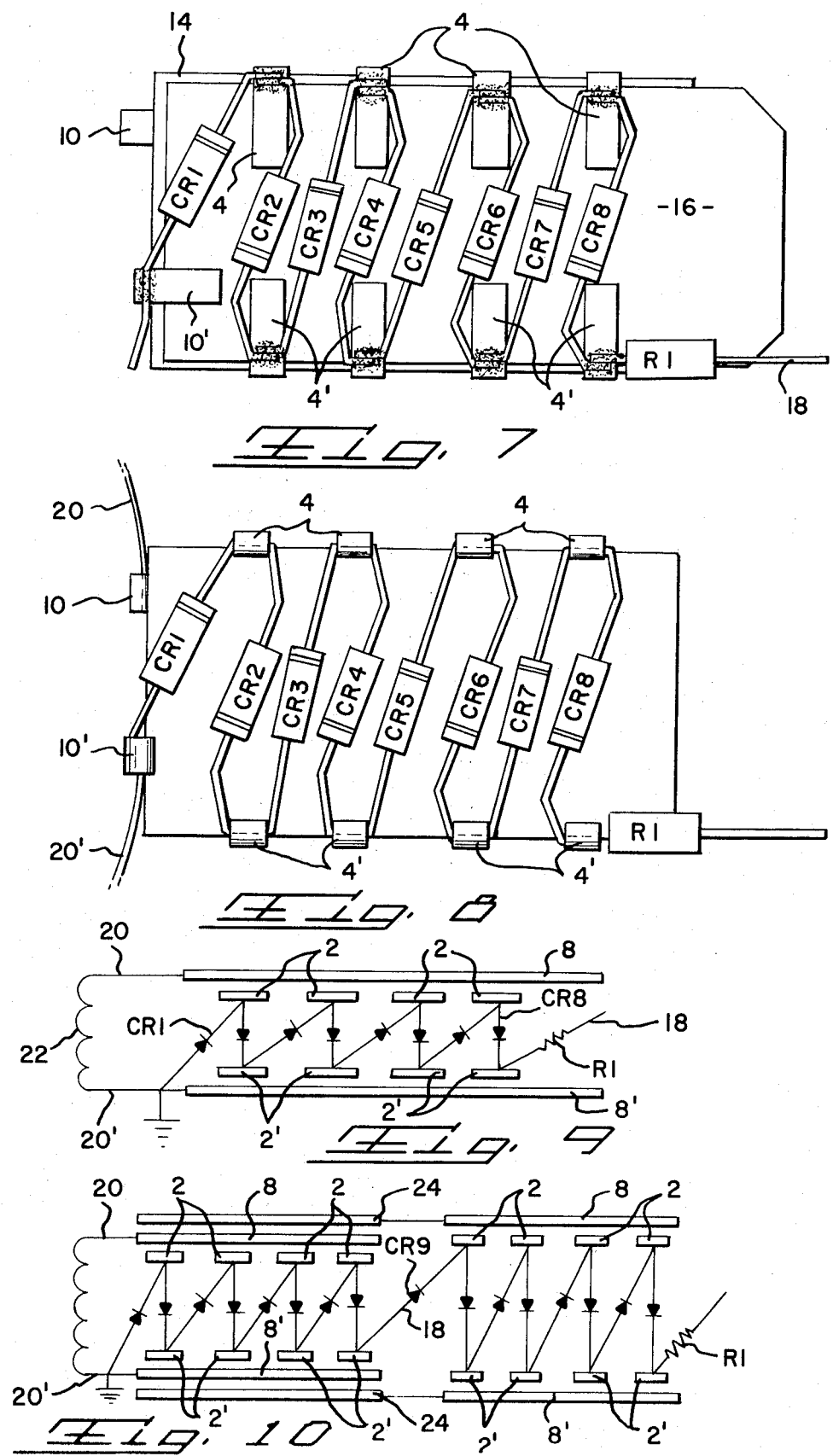

VOLTAGE MULTIPLYING WAFER CAPACITOR

The present invention relates generally to a multiplying wafer-type capacitor suitable for low current applications. According to the invention, a plurality of secondary capacitor plates are arranged in coplanar relationship, with each of the secondary plates in parallel with one of a pair of input plates. Dielectric sheet material surrounds the plates and is interposed between the plates. Dielectric adhesive is utilized to join the sheets of dielectric material into a wafer configuration. The secondary plates are successively coupled in series by directional coupling means such as diodes, for example.

Accordingly, it is an object of the present invention to provide a wafer-type capacitor of the voltage multiplying type.

Another object of the present invention is to provide a method of assembling a wafer-type capacitor of the voltage multiplying type.

Another object of the present invention is to provide a wafer-type capacitor having a plurality of coplanar secondary capacitor plates associated with one of a pair of coplanar primary capacitor plates.

Another object of the present invention is to provide a wafer-type capacitor having a pair of coplanar input plates and a plurality of coplanar secondary capacitor plates each associated with one of the primary plates, and further with the output plate being successively directionally coupled in series by directional coupling means.

Another object of the present invention is to provide a method for assembling a wafer-type capacitor wherein a plurality of secondary coplanar capacitor plates are associated with one of a pair of coplanar primary capacitor plates, and wherein diodes are connected between opposed secondary plates.

Other objects and many attendant advantages of the present invention will become apparent upon perusal of the following detailed description taken in conjunction with the drawings, wherein:

FIG. 7 is an enlarged diagrammatic plan view of the structure shown in FIG. 6 with diodes successively joined between opposed tabs;

FIG. 8 is an enlarged diagrammatic plan view of a preferred embodiment of the wafer capacitor according to the present invention;

FIG. 9 is an electrical schematic of the preferred embodiment as shown in FIG. 8; and FIG. 10 is an electrical schematic of a modification of the preferred embodiment as shown in FIGS. 8 and 9.

Figure 1:
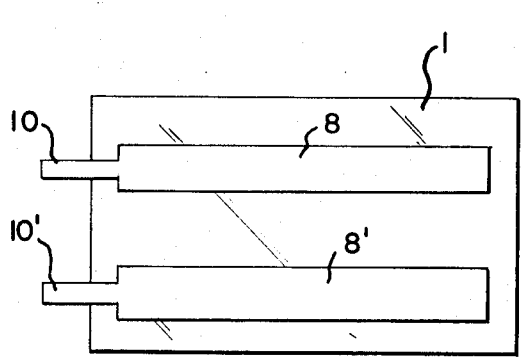
FIG. 1 is a diagrammatic plan of dielectric material in sheet form with a first pair of primary or input plates.
Figure 2:
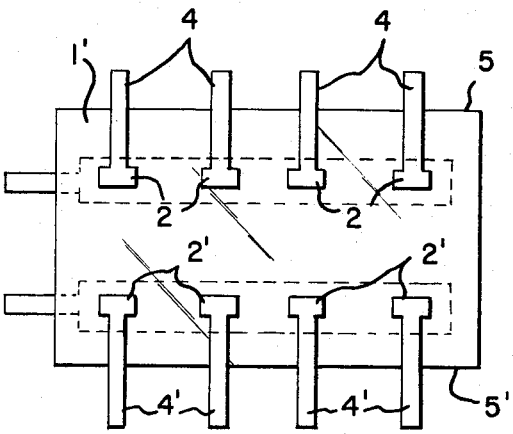
FIG. 2 is a diagrammatic plan of a plurality of coplanar opposed secondary capacitor plates superimposed over dielectric material and the primary plates as shown in FIG. 1, and wherein each of the secondary plates is provided with an integral tab.

With more particular reference to the drawings, there is more particularly shown in FIG. 1 a single sheet or a plurality of stacked sheets generally indicated at 1 of a suitable capacitor dielectric material having superimposed thereon a plurality of primary plates 8 and 8' having respective tabs 10 and 10' protruding from the edge margin 3 of the dielectric material 1. As shown in FIG. 2, a plurality of additional sheets 1' are superimposed on the plates 8 and 8' together with a plurality of capacitor plates 2 each provided with an integral elongated tab 4 which protrudes from a lateral edge margin 5 of the dielectric sheet or sheets 1'. In addition, a plurality of similar opposed coplanar secondary capacitor plates 2' are placed in overlying relationship on the sheet or sheets 1' with an elongated tab 4' of each plate 2' protruding beyond the lateral edge margin 5' of the sheet or sheets 1'. As shown in FIG. 2, the edge margin 5' is opposed with respect to the edge margin 5, and the plates 2 and 2' may advantageously be fabricated from a conductive foil with their respective tabs 4 and 4' also of foil and integrally fabricated together with their respective plates.

Figure 3:
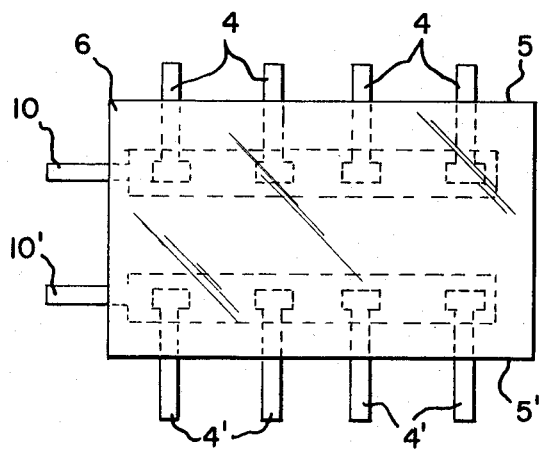
FIG. 3 is a diagrammatic plan of the structure as shown in FIG. 2 with additional dielectric material in sheet form superimposed over the secondary capacitor plates.

FIG. 3 illustrates the addition of a sheet or sheets 6 of dielectric material superimposed over the plates 2 and 2'. The additional sheet or sheets 6 include lateral side margins 5 and 5' which correspond to the lateral side margins of the sheet or sheets 1.

Figure 4:
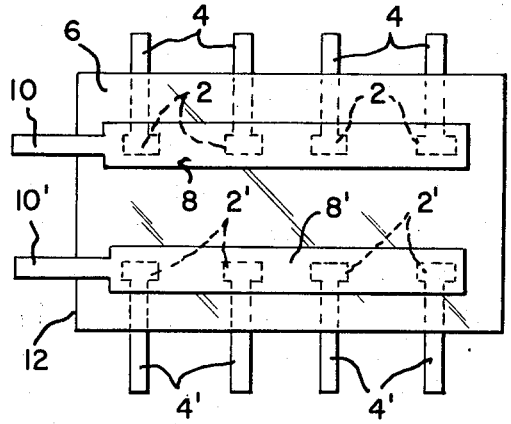
FIG. 4 is a diagrammatic plan view of the structure as shown in FIG. 3 with an additional pair of coplanar primary capacitor plates superimposed over the structure as shown in FIG. 3.

As shown in FIG. 4, another pair of elongated primary capacitor plates 8 and 8' are superimposed over the dielectric sheet or sheets 6. The plate 8 is additionally superimposed over each of the plates 2 and includes an elongated tab 10 extending beyond the lateral side margin 12 of the sheet or sheets 6 and superimposed over the tab 10 of the plates 8 shown in FIG. 1. In similar fashion, the plate 8' is superimposed over each of the plates 2' and includes an elongated tab 10' also protruding beyond the lateral side margin 12 of the sheet or sheets 6 and superimposed over the tab 10' of the plate 8' shown in FIG. 1. Thus, the dielectric sheet or sheets 6 are interposed between the primary capacitor plates and the secondary capacitor plates.

Figure 5:
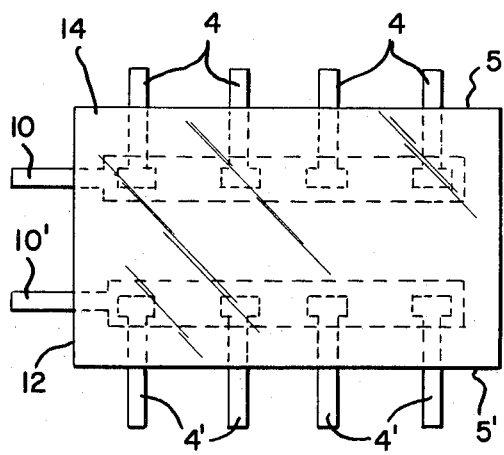
FIG. 5 is a diagrammatic plan view of the structure as shown in FIG. 4 with additional dielectric material in sheet form superimposed over the primary plates.

FIG. 5 illustrates the addition of a sheet or sheets 14 of dielectric material superimposed over the primary plates 8 and 8'. The sheet or sheets 14 include lateral side margins 5, 5' and 12 which correspond to the side margins as in the previously assembled dielectric sheets 1, 1' and 6. In practice, the dielectric sheets are permanently fixed to one another with a suitable dielectric adhesive with the primary plates 8 and 8' and the secondary plates 2 and 2' imbedded within the superimposed dielectric sheets 1, 6 and 14 to form a wafer configuration. The sheets 1 and 14 form covers for the primary and secondary plates.

Figure 6:
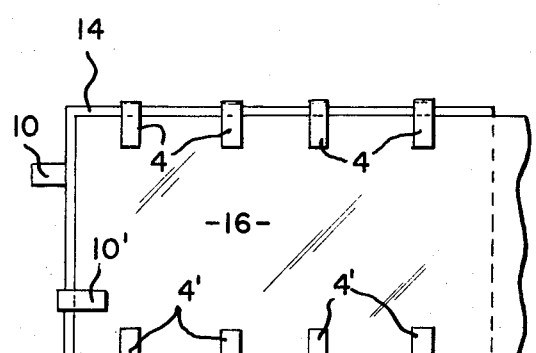
FIG. 6 is a diagrammatic plan view of the structure as shown in FIG. 5 further with the addition of a sheet of polytetrafluroethylene (PTE) temporarily superimposed over the structure as shown in FIG. 5 with certain tabs of the primary and secondary plates folded in overlying relationship over the (PTE) sheet.

With reference to FIG. 6, further assembly of the preferred embodiment will be described in detail. A sheet 16 of heat insulating material such as polytetrafluroethylene is superimposed over the sheet or sheets 14, and the tabs 4, 4' and 10' are folded to overlie the sheets 16. As shown in FIG. 7, a first diode CR1 includes a pair of electrical leads which are respectively soldered to the tabs 10' of the primary plates 8' and to the tab 2 of the secondary plate associated with the other primary plate 2. In similar fashion, diodes CR2 through CR8 are each soldered between opposed tabs 2 and 2' such that the plates 2 and 2' are successively and unidirectionally coupled by the diodes. In practice, each of the tabs 2 and 2' receive a pair of diode leads soldered thereto. Thus, to reduce assembly time, the diodes are first placed in pairs upon the assembly and their electrical leads are simultaneously soldered to the required tab with which they are to be joined. To complete the assembly, a resistor R1 is soldered to the last of the successive interconnected tabs 2', with a lead 18 of the resistor R1 providing an output lead for the assembly. As shown in FIG. 8, each of the tabs 2 and 4 are then rolled or folded over on itself and soldered in place. Electrical lead wires 20 and 20' are soldered to respective tabs 10 and 10' before the tabs 10 and 10' are rolled or folded over on themselves and soldered in place.

FIG. 9 illustrates an electrical schematic of the preferred embodiment as shown in FIG. 8 with the leads 20 and 20' connected to a transformer secondary 22, for example, and the lead 20' reference to ground. The circuit of FIG. 9 may be repeated to provide additional voltage multiplication as can be seen with reference to FIG. 10. Thus in FIG. 10, the circuit of FIG. 9 is repeated with the addition of a pair of input plates 8 and 8' together with the associated secondary plates 2 and 2' coupled by a diode CR9 to one of the plates 2'. The plate 8 of the additional circuit is electrically coupled to a plate 24 which is capacitive coupled with the plate 8 of the initial circuit as shown in FIG. 9. In similar fashion, the plate 8' of the additional circuit is electrically coupled to a plate 24 that is capacitive coupled to the plate 8 of the initial circuit as shown in FIG. 9.

Although preferred embodiments of the invention are described in detail, it should be understood that additional embodiments and modifications of the present invention which would be obvious to an artisan are to be covered by the spirit and scope of the appended claims, wherein:

What is claimed is:

1. A multiplying condenser comprising the assembly of
   an insulating support means,
   a pair of separate elongated conductive strips mounted in spaced side-by-side relation on the support means,
   a plurality of discrete electrodes spaced along each of the respective strips in superposed capacitively coupled relation therewith,
   each of the strips and electrodes being provided with terminals protruding beyond the edges of the support,
   insulating sheet means extending over the electrodes without covering the terminals,
   and means for securing the sheet means to the underlying support means to maintain the strips and electrodes in assembled relation therebetween with the terminals exposed.

2. A multiplying condenser in accordance with claim 1 wherein the means for securing the sheet means to the underlying support means comprises a dielectric sheet between the conductive strips and electrodes adhesively secured to the support means and to the insulating sheet means overlying the electrodes.

3. A multiplying condenser in accordance with claim 2 wherein the support means and the insulating sheet means extend beyond the edges of the conductive strips and electrodes whereby the assembly is sealed by the adhesion of the support means and insulating sheet means.

4. A multiplying condenser according to claim 1 including,
   a plurality of condenser assemblies in stacked relation, each assembly having the structure of claim 1,
   said insulating sheet means of each condenser assembly of the stack forming the insulating support means for the condenser assembly thereabove,
   the respective terminals of the strips and electrodes of each of the condenser assemblies being in superposed relation with corresponding ones in the other layers.

5. A multiplying condenser according to claim 4 wherein the means for securing the sheet means to the underlying support means comprises a dielectric sheet between the conductive strips and electrodes adhesively secured to the support means and to the insulating sheet means overlying the electrodes.

6. A multiplying condenser according to claim 5, wherein the support means and the insulating sheet means extend beyond the edges of the conductive strips and electrodes whereby the assembly is sealed by the adherence of the support means and insulating sheet means.

* * * * *